(12) United States Patent
Mori et al.

(10) Patent No.: US 9,780,376 B2
(45) Date of Patent: Oct. 3, 2017

(54) CONDUCTIVE AGENT FOR BATTERY ELECTRODE, ELECTRODE CONTAINING THE SAME, AND BATTERY

(71) Applicants: PI R&D CO., LTD., Yokohama-shi (JP); Mori Polymer Co., Inc., Yokohama-shi (JP)

(72) Inventors: Takaki Mori, Yokohama (JP); Toshiyuki Goshima, Yokohama (JP); Maw Soe Win, Yokohama (JP)

(73) Assignees: PI R&D CO., LTD., Yokohama-shi (JP); MORI POLYMER CO., INC., Yokohama-shi (JP)

( * ) Notice: Subject to any disclaimer, the term of this patent is extended or adjusted under 35 U.S.C. 154(b) by 175 days.

(21) Appl. No.: 14/711,495

(22) Filed: May 13, 2015

(65) Prior Publication Data
US 2015/0249251 A1 Sep. 3, 2015

Related U.S. Application Data

(62) Division of application No. 12/993,729, filed as application No. PCT/JP2009/059190 on May 19, 2009.

(30) Foreign Application Priority Data

May 22, 2008 (JP) ................................ 2008-134011

(51) Int. Cl.
*H01M 10/052* (2010.01)
*H01M 4/133* (2010.01)
(Continued)

(52) U.S. Cl.
CPC ......... *H01M 4/625* (2013.01); *H01M 4/0404* (2013.01); *H01M 4/13* (2013.01);
(Continued)

(58) Field of Classification Search
CPC ...... H01M 4/621; H01M 4/622; H01M 4/623; H01M 4/625; H01B 1/24
See application file for complete search history.

(56) References Cited

U.S. PATENT DOCUMENTS 5,955,233 A * 9/1999 Urashima .......... G03G 9/08711
430/109.2
6,001,507 A 12/1999 Ono et al.
(Continued)

FOREIGN PATENT DOCUMENTS

EP 0 552 731 A1 7/1993
JP 58-147965 A 9/1983
(Continued)

OTHER PUBLICATIONS

Ge et al., "Multiwalled Carbon Nantoubes with Chemically Grafted Polyetherimides," J. Am. Chem. Soc., 2005, 127, 9984-9985, Published Jun. 22, 2005.*
(Continued)

*Primary Examiner* — Ula C Ruddock
*Assistant Examiner* — Amanda Barrow
(74) *Attorney, Agent, or Firm* — Birch, Stewart, Kolasch & Birch, LLP

(57) ABSTRACT

Disclosed is a highly reliable secondary battery, as well as an electrode and a conductive agent used therefor, which battery has a long cycle life and is also less likely to be damaged or rupture even when the battery temperature becomes abnormally high. The conductive agent of the battery electrode contains, as the main component, a reaction product between a π-conjugated carbon material and a soluble polyimide, preferably a soluble block copolymerized polyimide. The battery electrode is formed by coating a
(Continued)

composition containing this conductive agent and an electrode active substance onto a current collector. The battery comprises this electrode.

16 Claims, 1 Drawing Sheet

(51) Int. Cl.
*H01M 4/1393* (2010.01)
*H01M 4/62* (2006.01)
*H01M 4/13* (2010.01)
*H01M 4/04* (2006.01)

(52) U.S. Cl.
CPC ......... *H01M 4/133* (2013.01); *H01M 4/1393* (2013.01); *H01M 4/622* (2013.01); *H01M 10/052* (2013.01)

(56) References Cited

U.S. PATENT DOCUMENTS

| | | | |
|---|---|---|---|
| 6,083,426 A | | 7/2000 | Shimasaki et al. |
| 6,417,283 B1* | | 7/2002 | Ikeda ................ B82Y 30/00 |
| | | | 428/402.24 |
| 6,451,480 B1 | | 9/2002 | Gustafson et al. |
| 2002/0086781 A1* | | 7/2002 | Okuda ............... G03G 15/0233 |
| | | | 492/56 |
| 2003/0040578 A1 | | 2/2003 | Sugo et al. |
| 2003/0049535 A1 | | 3/2003 | Ohta et al. |
| 2004/0024107 A1 | | 2/2004 | Nojiri et al. |
| 2004/0071990 A1 | | 4/2004 | Moriyama et al. |
| 2006/0084742 A1* | | 4/2006 | Ishida ................ C08L 9/02 |
| | | | 524/425 |
| 2006/0104009 A1* | | 5/2006 | Kanbara ............. H01G 9/042 |
| | | | 361/502 |
| 2007/0202403 A1 | | 8/2007 | Oh et al. |
| 2007/0235692 A1* | | 10/2007 | Wu ..................... C08F 2/44 |
| | | | 252/500 |
| 2008/0003503 A1 | | 1/2008 | Kawakami et al. |
| 2008/0096109 A1* | | 4/2008 | Fukumine ........... H01M 4/0404 |
| | | | 429/212 |
| 2008/0113266 A1* | | 5/2008 | Park .................... H01M 4/0445 |
| | | | 429/215 |
| 2008/0124631 A1 | | 5/2008 | Fukui et al. |

FOREIGN PATENT DOCUMENTS

| | | | |
|---|---|---|---|
| JP | 8-315859 A | 11/1996 | |
| JP | 10-312791 | * 11/1998 | ............. H01M 4/02 |
| JP | 10-312791 A | 11/1998 | |
| JP | 2000-67645 A | 3/2000 | |
| JP | 2002-88242 A | 3/2002 | |
| JP | 2002-289196 A | 10/2002 | |
| JP | 2003-246927 A | 9/2003 | |
| JP | 2005-197096 A | 7/2005 | |
| JP | 2005-231934 A | 9/2005 | |
| JP | 2006-100222 A | 4/2006 | |
| JP | 2008-16446 A | 1/2008 | |
| JP | 2008-34352 A | 2/2008 | |
| WO | WO 2006/052313 A1 | 5/2006 | |
| WO | WO 2007/029934 A1 | 3/2007 | |

OTHER PUBLICATIONS

Yuen et al., "Preparation and Morphological, Electrical, and Mechanical Properties of Polyimide-Grafted MWCNT/Polyimide Composite," J. Polymer Science: Part A: Polymer Chemistry, vol. 45 3349-3358, Published Jun. 15, 2007.*
European Search Report dated Feb. 10, 2014 for EP 09 75 0565.
International Search Report for PCT/JP2009/059190 mailed Aug. 11, 2009.

* cited by examiner

CONDUCTIVE AGENT FOR BATTERY ELECTRODE, ELECTRODE CONTAINING THE SAME, AND BATTERY

CROSS-REFERENCE TO RELATED APPLICATIONS

This application is a Divisional of copending application Ser. No. 12/993,729 filed on Apr. 21, 2011, which is the U.S. National Phase of PCT/JP2009/059190, filed May 19, 2009, and which claims priority to Application No. 2008-134011 filed in Japan, on May 22, 2008. The entire contents of all of the above applications are hereby incorporated by reference.

TECHNICAL FIELD

The present invention relates to a conductive agent for electrodes of batteries such as lithium batteries, as well as to an electrode containing the conductive agent and a battery.

BACKGROUND ART

In recent years, as a negative electrode material for lithium secondary batteries, carbon materials such as coke and graphite have been proposed to replace conventional lithium metals because, for example, they have superior flexibility and are not likely to cause electrodeposition of mossy lithium.

A negative electrode using the aforementioned carbon material is usually prepared by, for example, a method in which carbon powder (such as graphite and coke powder) and, as required, conductive agent powder (such as acetylene black and carbon black) are dispersed in a binding agent solution to produce a slurry, which is then coated onto a current collector metal by the doctor-blade method and subsequently dried.

Thus, conventionally, as the binding agent solution, a solution in which PVDF (polyvinylidene difluoride) is dissolved into NMP (N-methyl-2-pyrrolidone) has been used.

However, although PVDF is an excellent binding agent for integrating carbon powder, since its adhesiveness (adhesion) with a current collector metal is poor, the carbon powder detaches from the current collector metal (such as a copper plate and a copper foil) by repeated charge and discharge, thereby gradually lowering the battery capacity. That is, those batteries using PVDF have a problem in that their cycle life is generally short. The same tendency is observed also in the relation between a positive electrode active substance and the binding agent.

In addition, PVDF not only allows stable adhesion of those carbon powders themselves used as a negative electrode active substance and positive electrode active substances themselves, but also stably adheres those conductive agents blended in positive and negative electrodes, as well as a conductive agent with an active substance, thereby maintaining a balance between electrons and ions within a battery. Their adhesion (attachment) and dispersibility are consequently poor; therefore, in order to attain smooth charge and discharge, it is necessary to blend a large amount of conductive agent at the expense of the battery capacity. Moreover, since the conductive agent per se is a foreign matter to the active substance, mechanical bonding between the active substance and the conductive agent, and blending a large amount of the active substance and conductive agent cause drawbacks such as corrosion and cycle deterioration.

PRIOR ART DOCUMENTS

Patent Documents

[Patent Document 1] JP 9-265990 A
[Patent Document 2] JP 3561701 B

SUMMARY OF THE INVENTION

Problems to be Solved by the Invention

The present invention was made in view of the above circumstances and an object thereof is to provide a highly reliable battery, as well as an electrode and a conductive agent used therefor, which battery has a long cycle life and is also less likely to be damaged or ruptured even when the battery temperature becomes abnormally high.

Means for Solving the Problems

The present inventors intensively studied to discover that the aforementioned object of the present invention can be attained by forming the conductive agent, which constitutes an electrode, from a composition containing, as the main component, a reaction product between a π-conjugated carbon material and a soluble polyimide, thereby completing the present invention.

That is, the present invention provides a conductive agent for battery electrodes, comprising as main component a reaction product between a π-conjugated carbon material and a soluble polyimide. The present invention also provides a battery electrode, which is formed by coating a composition containing the conductive agent according to the present invention and an electrode active substance onto a current collector. The present invention further provides a battery comprising the electrode according to the present invention.

Effects of the Invention

According to the present invention, provided for the first time are a highly reliable secondary battery, as well as an electrode and a conductive agent used therefor, which battery has a long cycle life and is also less likely to be damaged or ruptured even when the battery temperature becomes abnormally high. The conductive agent according to the present invention is characterized by containing, as the main component, a substance obtained by allowing a carbon material which is likely to cause separation or detachment phenomenon to react with a soluble polyimide. Thus, since the conductive agent and binder, as well as active substance and the like disperse without an energy barrier, a reduction in the specific resistance and interfacial resistance of the electrodes are observed. In addition, the charge and discharge efficiency is high and the battery capacity hardly decreases even with repeated cycles; therefore, the cycle life is long as well. Furthermore, since the soluble polyimide used in the present invention is believed to suppress redox-type oxidation reactions and radical chain reactions, inconveniences such as battery thermal runaway, smoking, ignition and explosion may be prevented.

MODE FOR CARRYING OUT THE INVENTION

Figure 1:
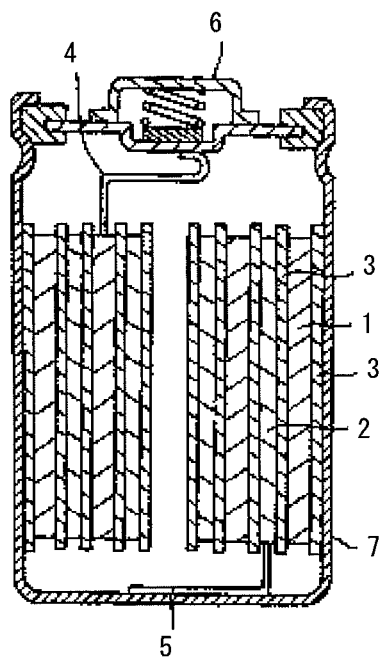
FIG. 1 is a schematic cross-sectional view of the lithium secondary battery prepared in Examples of the present invention.

As described above, the conductive agent according to the present invention contains, as the main component, a reaction product between a π-conjugated carbon material and a soluble polyimide.

Generally, π-conjugated carbon materials are also referred to as C6 compounds containing a π-bond. They are composed of carbon and contain a structure which forms an electron-conductive orbital band by coupling of the carbon π-electrons, in which structure 6-membered rings of carbon atoms are condensed in such a manner that regular hexagons are adjacently arranged one another (a small number of 5-membered and/or 7-membered rings may be present). Examples of preferred π-conjugated carbon material used in the present invention include Ketjen Black, acetylene black, carbon nanotube and other carbon materials having a primary particle diameter of not greater than 10 nm, and particularly preferred are Ketjen Blacks, acetylene blacks and carbon nanotubes. Here, specific examples of the aforementioned "other carbon materials having a primary particle diameter of not greater than 10 nm" include, for example, fullerene and carbon nanohorns. Since the aforementioned π-conjugated carbon materials are all commercially available, a commercially available product may be used. Also, such π-conjugated carbon materials may be used individually or two or more of them may be used in combination.

As described above, in the π-conjugated carbon materials, an electron-conductive orbital band is formed by coupling of the carbon π-electrons. Consequently, as a substance, the surface energy is extremely high; therefore, not only there arise problems, for example, that the conductive agent is likely to aggregate each other; that the adhesion between the active substance and current collector is low; and that the viscosity of slurry prepared to be coated onto electrodes is excessively increased, but also it is necessary to blend a large amount of conductive agent in order to attain the desired conductivity. In view of this, in order to mitigate the high surface energy of the aforementioned π-conjugated carbon materials, the present inventors searched for a substance capable of reacting with the surface of π-conjugated carbon material at a level where at least a complex can be formed, and discovered a soluble polyimide. Therefore, the conductive agent according to the present invention contains a soluble polyimide as an essential constituting component.

The soluble polyimide used in the present invention is a polyimide which is soluble to a nitrogen-containing polar solvent such as N-methyl-2-pyrrolidone (NMP). Here, being soluble means that the polyimide is dissolved in 100 g of a solvent at an amount of not less than 5 g. Examples of the polyimide used in the present invention include those soluble polyimides whose glass transition temperature is not higher than 270° C., more preferably not higher than 250° C., and such a soluble polyimide is preferably one which contains at least one component having a carbonyl group and/or an ether group as aromatic ring-linking group in the molecular skeleton. The lower limit of the glass transition temperature is not particularly restricted; however, it is usually not lower than 120° C. A lower glass transition temperature causes softening of the polyimide in the event where the battery temperature becomes high, such as thermal runaway or the like; therefore, there is a concern from the safety standpoint.

A polyimide can be obtained by dehydration-condensation reaction of a tetracarboxylic dianhydride and diamine. Examples of raw materials having a carbonyl group as the aromatic ring-linking group include 3,3',4,4'-benzophenonetetracarboxylic dianhydride, 3,3'-diaminobenzophenone, 4,4'-diaminobenzophenone, 4,4'-bis(4-aminophenoxy)benzophenone and the like. Examples of raw materials containing an ether group include bis(3,4-dicarboxyphenyl)ether dianhydride, 3,4'-diaminodiphenyl ether, 4,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 2,2-bis[4-(4-aminophenoxyl)phenyl]propane, 2,2-bis[4-(4-aminophenoxyl)phenyl]hexafluoropropane and bis[4-(3-aminophenoxyl)phenyl]sulfone, bis[4-(4-aminophenoxyl)phenyl]sulfone and the like. Further, a raw material containing neither a carbonyl group nor an ether group, for example, pyromellitic dianhydride, 3,3',4,4'-biphenyltetracarboxylic dianhydride, diphenylsulfone-3,3',4,4'-tetracarboxylic dianhydride, 2,2-bis(3,4-dicarboxyphenyl)hexafluoropropane dianhydride, 2,4-diaminotoluene, 4,4'-diamino-3,3'-dimethyl-1,1'-biphenyl, 4,4'-diamino-3,3'-dihydroxy-1,1'-biphenyl, 3,3'-diaminodiphenylsulfone, 4,4'-diaminodiphenylsulfone, 3,5-diaminobenzoic acid, 2,6-diaminopyridine, 2,6-diamino-4-methylpyridine, 3,3'-diaminodiphenylmethane, 4,4'-diaminodiphenylmethane, 3,3'-dicarboxy-4,4'-diaminodiphenylmethane, 4,4'-benzanilide, 4,4'-(1,3-phenylenediisopropylidene)bisaniline, 4,4'-(1,4-phenylenediisopropylidene)bisaniline, 4,4'-(9-fluorenylidene)dianiline or 5(6)-amino-1-(4-aminophenyl)-1,3,3-trimethylindane, may be used as one component of the copolymer composition. Moreover, an aliphatic compound such as cyclohexane-2,3,5,6-tetracarboxylic dianhydride or bicyclo[2.2.2]octo-7-ene-2,3,5,6-tetracarboxylic dianhydride and a diaminosiloxane compound such as bis(γ-aminopropyl)polydimethylsiloxane can be used in combination; however, when their proportion is increased, it is observed that the heat resistance and durability tend to be reduced. Here, the soluble polyimide used in the present invention may also be a copolymer which contains at least two or more of the respective aforementioned varieties of acid components and amine components, or a copolymer which contains one of either the acid component or amine component and two or more additional components other than this, and it is preferred that the soluble polyimide be a block copolymer.

With regard to the method of synthesizing the polyimide, any known method can be employed and it is not particularly restricted. A diisocyanate method in which a corresponding diisocyanate compound is used in place of the aforementioned diamine compound may be employed; however, it is preferred that a chemical imidization method using a catalyst such as acetic anhydride/triethylamine or γ-valerolactone/pyridine be employed. A soluble polyimide varnish can be obtained by loading into a reaction vessel the above-exemplified a tetracarboxylic dianhydride(s), a diamine compound(s), N-methyl-2-pyrrolidone (NMP) which is a solvent, an imidization catalyst and a dehydrating agent and subsequently allowing them to react with stirring for several hours under a nitrogen atmosphere at a temperature of 160 to 200° C. The mixing ratio of the tetracarboxylic dianhydride and the diamine is preferably 0.95 to 1.05 mol % of the total diamine amount with respect to 1 mol % of the total acid dianhydride amount. It is preferred that the solvent be a nitrogen-containing solvent, such as N,N-dimethylacetamide or NMP, which has a good dispersibility for the aforementioned conductive agent and a high solubility also for polyimides, and it is more preferred that the solvent be NMP. Further, the dehydrating agent is used for removing water generated during the reaction from the reaction system, and a solvent which is azeotroped with water may be used as the dehydrating agent. The dehydrating agent is preferably toluene and/or xylene and/or ethylcyclohexane. This dehydrating agent removes water with heat-reflux during the reaction such that no water remains in the varnish after completion of the reaction. A soluble polyimide prepared in this manner has a weight-average molecular weight of preferably 30,000 to 200,000, more preferably 40,000 to 150,000. When the weight-average molecular weight is not higher than 30,000, the flexibility and the mechanical strength tend to be impaired, while when it is not less than 200,000, the varnish viscosity tends to be high, thereby causing a problem in the step of dispersing the conductive agent. The term "solvent-soluble" used herein is applied to nitrogen-containing systems, such as NMP, where the conductive agent is easily dispersed. Considering the safety at the time of battery production, it is preferred that the polyimide be insoluble to other solvents.

As described above, the polyimide used in the present invention has a glass transition temperature of preferably not higher than 270° C., more preferably not higher than 250° C., and the polyimide is preferably a soluble polyimide which contains at least one component having a carbonyl group and/or an ether group as aromatic ring-linking group in the molecular skeleton. When the glass transition temperature is not lower than 270° C., the polyimide tends to be rigid and fragile as a resin. In order to make the glass transition temperature of a soluble polyimide to be not higher than 270° C., preferably not higher than 250° C., such a method in which an ether group is introduced or a raw material having a bent structure such as a meta-isomer is used is generally employed and superior. This agrees with the tendency of soluble polyimide compositions and is one of the reasons why soluble polyimides are advantageous in the present invention. It should be noted, however, that, since the glass transition temperature varies depending on the combination of the components constituting the polyimide, it is preferred that the polyimide having the aforementioned preferred glass transition temperature be selected from those polyimides which contain at least one component having a carbonyl group and/or an ether group as aromatic ring-linking group in the molecular skeleton. In cases where the main chain of the polyimide has a carbonyl group, since the carbonyl group and the aromatic ring(s) are highly flat, interaction with a substance comprising a π-conjugated carbon is likely to take place. In addition, in cases where the main chain of the polyimide has an ether group, since its loan pair contributes to stabilization of the interaction and also increases the flexibility of the polyimide structure, such a polyimide is preferred. Further, a raw material having a sulfonic group or carboxyl group may be used as appropriate. Such polar groups are advantageous in that they can stabilize the electrode active substance and, at the same time, can improve the adhesion (attachment) with the current collector metal. Such polyimides are commercially available, and examples of particularly suitable commercially-available solvent-soluble polyimide products include Q-VR-0756 (a block copolymerized polyimide produced from a raw material having a carbonyl group and an ether group) and Q-VR-0757 (a block copolymerized polyimide produced from a raw material having a carbonyl group and an ether group and a raw material having a carboxyl group), which are manufactured by PI R&D Co., Ltd.

Use of a polyimide as the binding agent (binder) of a lithium battery, particularly of a negative electrode, is described in the Patent Documents 1 and 2; however, since those conventional polyimides proposed as the binding agents have an extremely high glass transition temperature (Tg) and such polyimides are rigid, the flexibility of electrodes is low and there are concerns in terms of the adhesion against detachment and the like; therefore, it is impossible to produce a battery having practical reliability. Further, in conventional polyimides, since condensation curing of remaining amic acid is required, the electrodes must be dried under such a severe condition that the drying is carried out at a high temperature of at least about 350° C. for not less than 2 hours. Consequently, there arise problems of, for example, oxidative degradation of the current collector, so that such conventional polyimides are difficult to be used as a binder even in general batteries. However, the soluble polyimide used in the present invention does not have the aforementioned problems. Furthermore, from those examples in Patent Documents 1 and 2 which do not employ a widely-used material such as an active substance used in general lithium batteries, and particularly, also from the fact that the conductive material and the like employed therein for the positive electrode are used without a treatment with polyimide, it is judged that conventional polyimides are difficult to be used in general lithium batteries.

The conductive agent according to the present invention contains, as the main component, a reaction product between the aforementioned π-conjugated carbon material and the soluble polyimide. The reaction can be carried out by heating the π-conjugated carbon material and polyimide solution at a temperature not lower than 80° C., preferably not lower than 100° C. and not higher than 180° C., preferably not higher than 150° C., for a duration of preferably not less than 2 hours, more preferably not less than 3 hours. There is no upper limit on the reaction time, but unnecessarily long heating is meaningless and simply leads to an increased cost; therefore, the reaction time is usually not longer than 8 hours. The mixing ratio of the π-conjugated carbon material and the soluble polyimide at the time of the reaction is not particularly restricted; however, the amount of the soluble polyimide (not including solvent) is preferably about 10 to 200 parts by weight, more preferably about 50 to 150 parts by weight, with respect to 100 parts by weight of the π-conjugated carbon material. Further, as the solvent employed in the reaction, the solvent used in the polycondensation in the polyimide production may be employed as it is. That is, the soluble polyimide is produced in the solvent by polycondensation and, therefore, obtained in the form of a solution. The thus obtained solution may be used as it is. The aforementioned commercially available soluble polyimide products are also sold in the form of a solution; therefore, such a product may be used as it is for the reaction. The concentration of the polyimide in the soluble polyimide solution used for the reaction is not particularly restricted; however, it is usually about 10% by weight to 30% by weight. It is preferred that the reaction be carried out with stirring, thereby a reaction product can be obtained in the form of particles (hereinafter, this particulate reaction product may be referred to as "conductive agent toner"). Although not bound by a theory, it is believed that the surface of π-conjugated carbon and polyimide molecules form an orbit by the aforementioned reaction.

The conductive agent according to the present invention contains, as the main component, the aforementioned reaction product between a π-conjugated carbon material and a soluble polyimide. The term "the main component" means that the content of the reaction product exceeds 50% by weight, and the content is preferably not less than 90% by weight, more preferably not less than 99% by weight, most preferably 100% by weight (the conductive agent consists of the reaction product alone). The conductive agent may contain other substance(s) that does not inhibit the effects of the present invention and does not adversely affect the electrode performance, as long as its/their content is within the range of less than 50% by weight, preferably within the range of not higher than 10% by weight.

The conductive agent according to the present invention is used in the preparation of an electrode for secondary batteries such as lithium batteries and fuel cells. As the battery, a secondary battery is preferred and a lithium battery is particularly preferred. The electrode may either be a positive electrode or a negative electrode.

The electrode according to the present invention can be prepared in the same manner as conventional electrodes, except that the aforementioned conductive agent according to the present invention is used as the conductive agent. That is, the electrode according to the present invention is formed by coating a composition containing a conductive agent and an electrode active substance onto a current collector. As the current collector, as in the conventional method, a metal is preferably used. Preferably, the electrode can be prepared by coating a slurry containing the conductive agent according to the present invention and an electrode active substance onto such a current collector and subsequently drying it. Here, since the polyimide also functions as a binding agent, it is not necessary to use a separate binding agent; however, it may be used, and it is preferred to use such a separate binding agent since it is easier to uniformly coat the current collector. As the binding agent, those which are conventionally used for preparation of electrodes, such as PVDF, may be used. It is noted here that, although those conventional binding agents such as PVDF have a problem in the adhesion with current collector metals as described above, in cases where such a binding agent is used together with the conductive agent according to the present invention, those problems in the aforementioned prior arts do not occur because of the actions of the soluble polyimide.

The composition of the slurry to be coated onto the current collector is not particularly restricted; however, with respect to 100 parts by weight of the electrode active substance, the amount of the conductive agent is preferably 0.2 to 20 parts by weight, more preferably 1 to 5 parts by weight, and the amount of the binding agent is preferably 0 to 20 parts by weight, more preferably 1 to 5 parts by weight. In addition, the concentration of the conductive agent in the slurry is not particularly restricted; however, it is usually 0.1% by weight to 10% by weight, preferably about 0.5% by weight to 3% by weight.

In cases where the present invention is applied to, for example, a lithium secondary battery, as the positive electrode material (active substance), Li-containing composite oxides represented by the composition formula $Li_x MO_2$ or $Li_y M_2O_4$ (wherein, M is a transition element; $0<x\leq 1$, $0<y\leq 2$) and the like are exemplified. Specific examples of the Li-containing composite oxide include $LiCoO_2$, $LiMnO_2$, $LiNiO_2$, $LiCrO_2$ and $LiMn_2O_4$.

In cases where the present invention is applied to, for example, a lithium secondary battery, examples of the negative electrode material (active substance) include carbon compounds such as graphite, hard carbon and coke. In cases where the conductive agent toner according to the present invention causes lithium intercalation reaction and, therefore, has a battery capacity, the battery may also be designed with an addition of the battery capacity to the total capacity.

The positive electrode of the battery according to the present invention is prepared by, for example, mixing a positive electrode active substance and, as required, a conductive agent toner into a solution in which PVDF is dissolved in an organic solvent such as NMP to produce a slurry and subsequently coating the slurry onto a current collector metal by the doctor blade method, followed by drying of the organic solvent by evaporation.

The negative electrode of the battery according to the present invention is prepared by, for example, mixing a negative electrode active substance and, as required, a conductive agent toner into a solution in which PVDF is dissolved in an organic solvent such as NMP to produce a slurry and subsequently coating the slurry onto a current collector metal by the doctor blade method, followed by drying of the organic solvent by evaporation.

The present invention also provides a battery, preferably a secondary battery, particularly preferably a lithium battery, which comprises the aforementioned electrode according to the present invention. Except that the aforementioned electrode is used, a well-known battery structure may be employed.

In the battery according to the present invention, instead of using, as the conductive agent, a conventional π-conjugated carbon material as it is, by employing a conductive agent toner, good binding property of the π-conjugated carbon materials, as well as superior attachment between the π-conjugated carbon materials and the powder of positive electrode active substance, are attained. Consequently, even with repeated charge and discharge cycles, the conductive agent hardly detaches from the positive electrode active substance; therefore, the battery capacity is less likely to be reduced. Further, since a network of the conductive agents stably exists, the electrical resistance at the electrode parts can be stabilized, so that the reliability and safety as a battery can be ensured.

EXAMPLES

The present invention will now be described in more detail by way of examples thereof; however, the present invention is not restricted at all to the following examples. The present invention can be carried out by modifying it as appropriate within the range in which the gist of the present invention is not modified.

Example 1

1. Preparation of Conductive Agent Toners
(1) Preparation of Conductive Agent Toner 1

Loaded to a commercially available dispersion kneader machine (T. K. Hivis Disper Mix Model 3D-5 (manufactured by PRIMIX Corporation)) were 1,000 g of Ketjen Black EC600JD (manufactured by Lion Corporation), 1500 g of Q-VR-0756 (manufactured by PI R&D Co., Ltd.; 20% N-methyl-2-pyrrolidone (hereinafter, referred to as NMP) solution) as a polyimide varnish containing soluble polyimide, and 300 g of NMP as a dilution solvent. After pre-kneading this mixture by hand mixing, the resultant was kneaded for 2 hours at 100 rpm to obtain a slurry. After further loading 500 g of NMP as the dilution solvent, the resulting mixture was heated to 100° C. and stirred for 5 hours to obtain conductive agent toner 1.

(2) Preparation of Conductive Agent Toner 2

Conductive agent toner 2 was prepared under the same conditions as in the preparation of the conductive agent toner 1, except that Denka Black (manufactured by Denki Kagaku Kogyo K. K.) was employed as acetylene black in place of Ketjen Black EC600JD used in the preparation of a conductive agent toner 1.

2. Preparation of Lithium Battery (1) Preparation of Positive Electrode

Lithium-cobalt composite oxide (LiCoO$_2$) as a positive electrode active substance, the conductive agent toner 1 as a conductive agent, and PVDF #1300 (manufactured by Kureha Corporation) were dispersed in NMP at a solid content weight ratio of 94:1:5 (the active substance:the conductive agent:the binder) to obtain a slurry (solids concentration of 45% by weight). Thereafter, the thus obtained slurry was coated onto one side of an aluminum foil used as a positive electrode current collector by the doctor blade method, and NMP was dried at 120° C. in an oven to obtain a positive electrode.

(2) Preparation of Negative Electrode

A hard carbon, Carbotron P (manufactured by Kureha Corporation), as a negative electrode active substance, the conductive agent tonner 1 prepared in the Example 1 (Preparation of conductive tonner agent 1) as a conductive agent, and PVDF #1100 (manufactured by Kureha Corporation) were dispersed in NMP at a solid content weight ratio of 91:1:8 (the active substance:the conductive agent:the binder) to obtain a slurry (solids concentration of 50% by weight). Thereafter, the thus obtained slurry was coated onto one side of a copper foil used as the negative electrode current collector by the doctor blade method, and NMP was dried at 120° C. in an oven to obtain a negative electrode.

(3) Preparation of Electrolyte Solution

LiPF$_6$ was dissolved at a ratio of 1 mol/L in an equal-volume mixed solution of ethylene carbonate and dimethyl carbonate to prepare an electrolyte solution.

(4) Preparation of Battery

The above-prepared positive and negative electrodes and the electrolyte solution were used to prepare a cylindrical first battery MP1 (battery dimension: 14.2 mm in diameter; 50.0 mm in length). Here, used as the separator was a polypropylene-made microporous thin film having ion permeability (manufactured by Polyplastics Co., Ltd.; trade name "Cell Guard 3401").

FIG. 1 is a cross-sectional view of the thus prepared first battery MP1, and the first battery BA1 shown in the figure comprises a positive electrode 1, a negative electrode 2, a separator 3 which insulates these electrodes, a positive electrode lead 4, a negative electrode lead 5, a positive electrode external terminal 6, a negative electrode can 7 and the like. The positive electrode 1 and the negative electrode 2 are housed in the negative electrode can 7 in such manner that they are rolled in a spiral fashion via the separator 3 into which the electrolyte solution is injected. The positive electrode is are connected to the positive electrode external terminal 6 via the positive electrode lead 4, and the negative electrode 2 is connected to the negative electrode can 7 via the negative electrode lead 5, thereby enabling chemical energy generated inside the first battery BA1 to be drawn out as electric energy to the outside.

Example 2

A second battery MP2 was prepared in the same manner as in Example 1, except that the conductive agent toner 2 was employed as the conductive agent used in the preparation of the positive and negative electrodes.

Comparative Example 1

A third battery CP1 was prepared in the same manner as in Example 1, except that Ketjen Black EC600JD was used as it is as the conductive agent used in the preparation of the positive and negative electrodes.

Test Examples

1. Impedance of the Positive Electrode Surface

Figure 2:
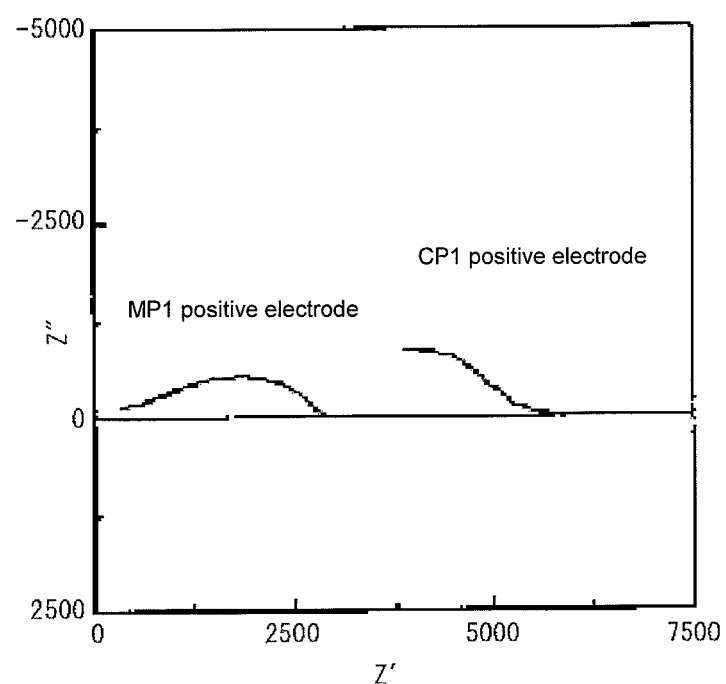
FIG. 2 shows the measurement results of the impedance in the planar direction in dried condition for each of the positive electrodes of the batteries prepared in an Example and Comparative Example.

For each of the positive electrodes prepared in Example 1 and Comparative Example 2, the impedance (Cole-Cole plots per 1 cm$^2$) in the planar direction in dried condition was measured. The results are shown in FIG. 2.

While the resistance component was 2.6 kΩ at the maximum for the positive electrode (MP1) prepared using the conductive tonner agent, the resistance component of not less than 3 Id) was present over the entire range for Comparative Example (CP1). In addition, in the electrode according to the present invention whose resistance component in the planar direction is small, the loss of voltage and electric power is small during charge and discharge, so that the battery performs with no problem. In contrast, since Comparative Example has a large resistance, it is believed that there would be problems of loss in the electric power, side reactions and the like.

2. Cycle Characteristics of Each Battery

For each of the batteries prepared in Examples 1 and 2 and Comparative Example 1, after charging the batteries at a charging current of 60 mA to a charge termination voltage of 4.2 V, the batteries were subjected to a cycle test, where one cycle was defined as the step of discharging at a discharging current of 200 mA to a discharge termination voltage of 2.5 V, to examine the cycle characteristics of each battery. In the batteries according to the present invention, MP1 and MP2, in which a reaction product between the polyimide and the nanocarbon (Ketjen Black or acetylene black) was used as the conductive agent, since the binding property of the nanocarbon and the adhesion between the nanocarbon and the current collector metal were superior, the electrode material hardly detached from the electrodes even with repeated charge and discharge cycles, and even at the 1,000th cycle at which the test was terminated, the capacity loss was 8% and 10% of the initial capacity, respectively. In contrast, in the comparative battery, CP1, the amount of the active substance and the like detached from the electrodes increased with the number of cycles, and at the 1,000th cycle, the capacity loss was as large as 26% of the initial capacity.

3. Safety Test

The safety of each battery, MP1, MP2 and CP1, was examined by a simple test method in which each battery was heated in an oven from room temperature to 200° C. While the battery cans of the batteries according to the present invention, MP1 and MP2, did not exhibit any change even when they were heated to 200° C., that of the comparative battery, CP1, blew its cap off at the point where it was heated to 150° C. due to an increased inner pressure. From these results, it is seen that, while the batteries according to the present invention, MP1 and MP2, are highly safe, the comparative battery, CP1, is at the risk of being damaged or rupturing when the battery temperature becomes abnormally high and, therefore, has a problem from the safety standpoint.

Although a cylindrical battery was exemplified in the above Examples, there is no particular restriction on the battery shape; therefore, in addition to the cylindrical type, the present invention is applicable to lithium secondary batteries of various shapes, such as those of flat type and block type.

INDUSTRIAL APPLICABILITY

According to the present invention, a highly reliable secondary battery, as well as an electrode and a conductive agent used therefor, which secondary battery has a long cycle life and also is less likely to be damaged or rupture even when the battery temperature becomes abnormally high, are provided.

DESCRIPTION OF SYMBOLS

1: Positive electrode
2: Negative electrode
3: Separator
4: Positive electrode lead
5: Negative electrode lead
6: Cap
7: Stainless container

The invention claimed is:

1. A method for producing a composition suitable for use in a battery electrode, said method comprising:
   (a) mixing a π-conjugated carbon material and a solution of a soluble polyimide to give a mixture having a mixing ratio of 10 to 200 parts by weight of the soluble polyimide (not including solvent) with respect to 100 parts by weight of the π-conjugated carbon material, wherein the polyimide contains at least one component comprising a unit having a carbonyl group and/or an ether group as an aromatic ring-linking group in the molecular skeleton, wherein the aromatic ring-linking group bridges two aromatic rings within the unit;
   (b) heating said mixture of the π-conjugated carbon material and the solution of the soluble polyimide to form a conductive agent, wherein said heating is carried out at a temperature of not lower than 80° C. and not higher than 180° C. for not less than 2 hours; and
   (c) mixing the conductive agent with an electrode active substance and a binder to form the composition, wherein the binder is PVDF, wherein the amount of the conductive agent in the composition is 1 to 5 parts by weight with respect to 100 parts by weight of the electrode active substance, and wherein the concentration of the conductive agent in the composition is 0.5% by weight to 3% by weight.

2. The method according to claim 1, wherein said electrode is for a secondary battery.

3. The method according to claim 2, wherein said electrode is a positive electrode or a negative electrode of a lithium battery.

4. The method according to claim 1, wherein said polyimide has a glass transition temperature of not higher than 270° C.

5. The method according to claim 1, wherein said π-conjugated carbon material is at least one selected from the group consisting of Ketjen Black, acetylene black, carbon nanotube and other carbon materials having a primary particle diameter of not greater than 10 nm.

6. The method according to claim 5, wherein said π-conjugated carbon material is at least one selected from the group consisting of Ketjen Black, acetylene black and carbon nanotube.

7. The method according to claim 1, wherein the soluble polyimide has a weight-average molecular weight of 30,000 to 200,000.

8. The method according to claim 1, wherein said mixing ratio of the π-conjugated carbon material and the soluble polyimide in the mixture is 50 to 150 parts by weight of the soluble polyimide (not including solvent) with respect to 100 parts by weight of the π-conjugated carbon material.

9. The method according to claim 1, wherein said heating is carried out at a temperature of not higher than 150° C.

10. The method according to claim 1, wherein said heating is carried out at a temperature of not lower than 100° C.

11. The method according to claim 1, wherein said heating is carried out at a temperature of not lower than 100° C. and not higher than 150° C.

12. A method for producing an electrode for a battery, said method comprising coating the composition according to claim 1 onto a current collector.

13. The method according to claim 12, wherein the amount of the conductive agent is 0.2 to 20 parts by weight with respect to 100 parts by weight of the electrode active substance.

14. The method according to claim 12, wherein said composition further contains a binder.

15. The method according to claim 12, wherein said electrode is a positive electrode of a lithium battery.

16. The method according to claim 12, wherein said electrode is a negative electrode of a lithium battery.

* * * * *